E. B. PACK.
NUT LOCK.
APPLICATION FILED NOV. 13, 1911.
1,034,289.
Patented July 30, 1912.
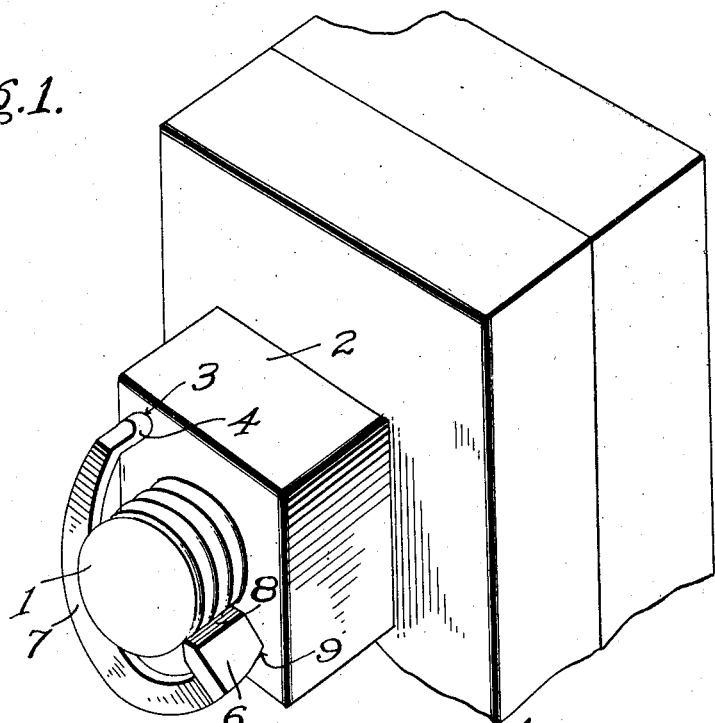
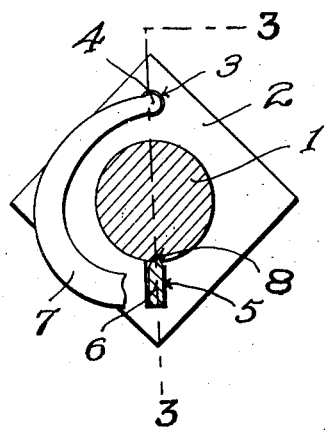
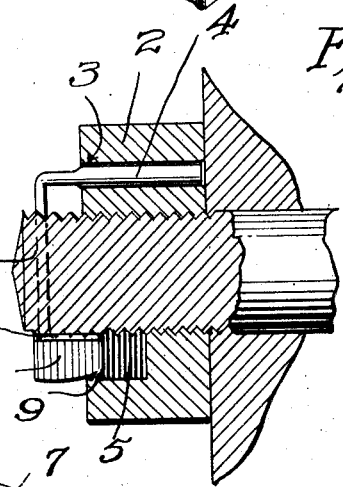
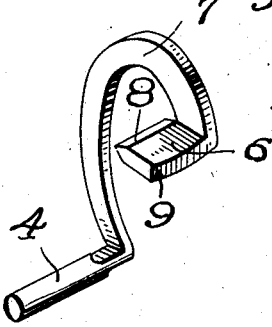
WITNESSES
INVENTOR
Evan B. Pack

UNITED STATES PATENT OFFICE.

EVAN B. PACK, OF COVINGTON, VIRGINIA.

NUT-LOCK.

1,034,289.  Specification of Letters Patent.  Patented July 30, 1912.

Application filed November 13, 1911. Serial No. 660,065.

*To all whom it may concern:*

Be it known that I, EVAN B. PACK, a citizen of the United States of America, residing at Covington, in the county of Alleghany and State of Virginia, have invented certain new and useful Improvements in Nut-Locks, of which the following is a specification, reference being had therein to the accompanying drawing.

This invention relates to nut locks and has for its object the production of a nut lock which will lock the nut against rotation at any desired point without the necessity of turning the same until a certain notch has been reached.

Another object of this invention is the production of a nut lock which is simple in construction, efficient in operation and consists of a minimum number of parts.

With these and other objects in view, this invention consists of certain novel constructions, combinations and arrangements of parts as will be hereinafter fully described and claimed.

In the drawings:—Figure 1 is a perspective of the nut lock. Fig. 2 is a plan view of the nut showing the bolt and locking means in section. Fig. 3 is a section taken on line 3—3, of Fig. 2. Fig. 4 is a detail perspective of the locking member.

Referring to the drawings by numerals, 1 designates the bolt which is threaded in the usual manner, and upon which is placed a nut 2. The nut 2 is provided with an aperture 3 formed in one corner thereof which extends therethrough. This aperture 3 receives an arm 4 of the locking member which arm is so mounted within the aperture as to allow the arm to rotate within the aperture when the locking member is swung upon the nut. A pocket 5 is formed in the outer face of the nut in diametrical alinement with the aperture 3 in the opposite corner of the nut and this socket 5 receives the thread-biting tooth 6 which tooth extends parallel with the arm 4 and at right angles to the body 7. The inner edge of the tooth 6 is sharpened upon both faces as illustrated at 8 so as to firmly grip the threads of the bolt. The body of the thread-gripping member is curved as illustrated in Fig. 2, the end carrying the thread-engaging tooth being curved to a greater extent than the rest of the body thereby greatly increasing the efficiency of the locking member. The outer edge of the thread-engaging tooth is tapered toward its free end as at 9 so as to allow said tooth to be driven in said socket 5 and cause the biting edge 8 of the tooth to enter the threads of the bolt.

As the tooth 6 engages the threads, an efficient lock will be produced which may be disengaged from the bolt by placing a tool under the body 7 and raising the same from the nut. It will be obvious also that the spring action of the body will resist rotation of the nut under ordinary conditions but to insure a positive lock, the tooth 6 is driven in the socket 5 thereby biting the threads and making it necessary to withdraw the tooth from the socket in order to remove the nut from the bolt.

What I claim is:—

A nut lock of the class described comprising a bolt, a nut provided with an aperture formed therein, said nut being provided with a socket formed therein opposite said aperture, a locking member carried by said nut comprising an arm, a curved body partly surrounding said bolt, a thread-engaging tooth carried by the free end of said body, said tooth being sharpened on one edge and being tapered upon its back for allowing said sharpened edge to bite into the threads upon said bolt when said tooth is driven into said socket.

In testimony whereof I hereunto affix my signature in presence of two witnesses.

EVAN B. PACK.

Witnesses:
C. D. OBENCHAU,
G. D. KLINE.